United States Patent
Lee et al.

(10) Patent No.: US 9,837,945 B2
(45) Date of Patent: Dec. 5, 2017

(54) MOTOR CONTROL METHOD AND SYSTEM

(71) Applicants: Hyundai Motor Company, Seoul (KR); Kia Motors Corporation, Seoul (KR)

(72) Inventors: Dong Hun Lee, Gyeonggi-Do (KR); Chang Seok Ryu, Gyeonggi-do (KR); Min Su Kang, Gyeonggi-do (KR); Sung Do Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/091,809

(22) Filed: Apr. 6, 2016

(65) Prior Publication Data
US 2017/0047877 A1   Feb. 16, 2017

(30) Foreign Application Priority Data
Aug. 12, 2015  (KR) .......................... 10-2015-0113938

(51) Int. Cl.
*H02P 6/06*   (2006.01)
*H02P 21/22*  (2016.01)
(Continued)

(52) U.S. Cl.
CPC .............. *H02P 21/22* (2016.02); *G01D 5/145* (2013.01); *G01P 3/48* (2013.01); *G01P 3/481* (2013.01);
(Continued)

(58) Field of Classification Search
CPC .................................. H02P 21/22; H02P 6/06
(Continued)

(56) References Cited

U.S. PATENT DOCUMENTS 7,397,210 B2 * 7/2008 Arai ........................ H02P 21/06
                                              318/434
7,472,000 B2 * 12/2008 Steiger ..................... G01D 3/08
                                              180/268
(Continued)

FOREIGN PATENT DOCUMENTS

DE   102012219914 A1   4/2014
JP   H0888993 A        4/1996
(Continued)

OTHER PUBLICATIONS

Partial European Search Report for European Patent Application No. 16165116.1, dated Jan. 17, 2017, 7 pages.
(Continued)

*Primary Examiner* — David S Luo
(74) *Attorney, Agent, or Firm* — Mintz Levin Cohn Ferris Glovsky and Popeo, P.C.; Peter F. Corless

(57) ABSTRACT

A motor control method and system are provided. The motor control method includes recognizing, by a controller, a driving signal for a motor and when the controller recognizes the driving signal, the controller determine a failure of multiple Hall sensors disposed within the motor, based on signals detected by the multiple Hall sensors. Additionally, when the Hall sensors in the motor are determined to be faulty, the controller identifies a faulty Hall sensor from among the multiple Hall sensors by analyzing respective frequencies of the signals detected by the multiple Hall sensors.

13 Claims, 4 Drawing Sheets

(51) Int. Cl.
  *G01P 3/48*   (2006.01)
  *G01P 3/481*  (2006.01)
  *G01D 5/14*   (2006.01)
  *G01P 21/02*  (2006.01)
  *H02P 6/17*   (2016.01)

(52) U.S. Cl.
  CPC ............... *G01P 21/02* (2013.01); *H02P 6/06* (2013.01); *H02P 6/17* (2016.02)

(58) Field of Classification Search
  USPC .................. 318/400.38, 400.37, 400.01, 700
  See application file for complete search history.

(56) References Cited

U.S. PATENT DOCUMENTS

| | | | |
|---|---|---|---|
| 9,239,345 B2* | 1/2016 | Liu | ................ G01R 23/00 |
| 2015/0001270 A1 | 1/2015 | Merkel et al. | |

FOREIGN PATENT DOCUMENTS

| | | |
|---|---|---|
| JP | H08-172721 A | 7/1996 |
| JP | H1189272 A | 3/1999 |
| JP | 2001-079041 | 3/2001 |
| JP | 2001-161089 A | 6/2001 |
| JP | 2006-214148 A | 8/2006 |
| JP | 2015-033282 A | 2/2015 |
| KR | 2009-0039485 A | 4/2009 |
| KR | 2012-0060059 A | 6/2012 |
| KR | 2013-0065411 A | 6/2013 |
| KR | 10-1348635 B1 | 1/2014 |

OTHER PUBLICATIONS

Extended European Search Report for European Patent Application No. 16165116, dated May 10, 2017, 17 pages.

* cited by examiner

ALL HALL SENSOR SIGNALS ARE IN NORMAL STATE

AMONG HALL SENSOR SIGNALS,
HALL_B SIGNAL IS IN ABNORMAL STATE

MOTOR CONTROL METHOD AND SYSTEM

CROSS REFERENCE TO RELATED APPLICATION

The present application claims priority to Korean Patent Application No. 10-2015-0113938, filed Aug. 12, 2015, the entire contents of which is incorporated herein for all purposes by this reference.

BACKGROUND

1. Field of the Invention

The present invention relates to a motor control method and system, which determine a failure of Hall sensors in a motor and control the motor even when a failure occurs in some of the Hall sensors.

2. Description of the Related Art

A typical 3-phase motor includes a 3-phase coil installed on a stator and a permanent magnet magnetized on a rotor. A driving circuit for the 3-phase motor causes current to flow through respective phases of coils on the stator, and the rotor of the motor is rotated by a magnetic field based on the current supplied from the driving circuit. To continuously rotate the rotor of the motor in one direction, the position of the rotor must be detected, and switching elements for switching the directions of currents flowing through the respective phases of the coils must be sequentially turned on and off based on the detected position of the rotor.

In particular, the accurate position of the rotor is detected using three Hall signals, which are formed by the magnetic field of the rotor and have a phase difference of 120°. The three Hall signals are detected by Hall detectors such as Hall sensors or Hall Integrated Circuits (ICs). Therefore, the motor and the driving circuit thereof are driven or operated when the position information of the rotor is obtained from the Hall sensors. However, such Hall sensors are known to easily break down and also vary due to external factors, such as temperature, thus resulting in the malfunction of the motor.

Therefore, as a fault diagnosis control method for preventing the malfunction of a motor has been developed in the related art and includes analyzing eigenvalues using a Minimum Description Length (MDL) technique and utilizing the number of signal eigenvalues having magnitudes greater than those of noise eigenvalues as a new fault index, thus perfectly performing fault diagnosis. However, since this method cannot detect faults even in the Hall sensors disposed within the motor, the above problem still remains without being solved.

The foregoing is intended merely to aid in the better understanding of the background of the present invention, and is not intended to mean that the present invention falls within the purview of the related art that is already known to those skilled in the art.

SUMMARY

Accordingly, the present invention provides a motor control method, which may determine a failure individual Hall sensors disposed within a motor, and may suitably operate the motor even when the motor fails, based on such determination.

According to one aspect, the present invention provides a motor control method that may include recognizing, by a controller, a driving signal for a motor; when the controller recognizes the driving signal; determining, by the controller, failure of multiple Hall sensors disposed within the motor, based on signals detected by the multiple Hall sensors; and when a failure of the Hall sensors is determined, identifying, by the controller, a faulty Hall sensor from among the multiple Hall sensors by analyzing respective frequencies of the signals detected by the multiple Hall sensors.

The detection of the failure of the multiple Hall sensors may include, when the controller recognizes the driving signal, receiving, by the controller, the detected signals from the multiple Hall sensors disposed within the motor; and when the multiple detected signals are identical to each other, determining, by the controller, a failure of one or more of the multiple Hall sensors. The motor control method may further include, after determining a failure of the multiple Hall sensors, when the multiple Hall sensors disposed within the motor are determined to be normal (e.g., no failure detected), calculating, by the controller, a current difference value that is a difference between a current command value, generated by driving of the motor, and a motor control current value; and when the calculated current difference value is greater than a preset current difference reference value, stopping, by the controller, driving of the motor.

The motor control method may further include, after calculating the current difference value, when the current difference value is less than or equal to the preset current difference reference value, comparing, by the controller, a first elapsed time with a preset first reference time, wherein the first elapsed time may be a period of time elapsed from a time at which the driving signal for the motor is recognized; when the first elapsed time is greater than the first reference time, calculating, by the controller, a rotational speed (RPM) difference value that is a difference between an RPM command value, generated by driving of the motor, and an RPM value of the motor; and when the calculated RPM difference value is greater than a preset RPM difference reference value, identifying, by the controller, a faulty Hall sensor.

Additionally, the motor control method may further include, after calculating the RPM difference value, when the calculated RPM difference value is less than or equal to the preset RPM difference reference value, determining, by the controller, the Hall sensors in the motor to be in a normal state. The identification of the faulty Hall sensor may include increasing, by the controller, RPM of a stator of the motor to a preset target RPM value; after the RPM of the stator of the motor has reached the target RPM value, receiving, by the controller, frequency value signals detected by respective Hall sensors in the motor; calculating, by the controller, frequency difference values that are differences between the received frequency values of respective Hall sensors and a frequency reference value; and when the calculated frequency difference values for respective Hall sensors are equal to or greater than a preset frequency difference reference value, determining, by the controller, the corresponding Hall sensors to be in a faulty state.

The motor control method may further include, after calculating the frequency difference values, when the calculated frequency difference values for respective Hall sensors are less than the preset frequency difference reference value, comparing second elapsed times with a preset second reference time, wherein the second elapsed times may be periods of time elapsed from times at which the calculated frequency difference values for respective Hall sensors are less than the frequency difference reference value; and when the second elapsed times are less than or equal to the second reference time, determining, by the controller, the corresponding Hall sensors to be in a faulty state.

Further, the motor control method may further include, after comparing with the second reference time, when the second elapsed times are greater than the second reference time, determining, by the controller, the corresponding Hall sensors to be in a normal state. The motor control method may further include, after identifying the faulty Hall sensor, when a Hall sensor in a normal state is present in the motor, receiving, by the controller, a signal from the Hall sensor determined to be in a normal state; when the signal from the Hall sensor, received by the controller, is varied, calculating, by the controller, RPM of the motor and a position of a rotor using variation; and calculating, by the controller, a motor control current value using the RPM of the motor and the position of the rotor.

The motor control method may further include, after calculating the motor control current value, calculating, by the controller, a current difference value that is a difference between a preset current reference value and the motor control current value; and when the calculated current difference value is greater than a preset current difference reference value, stopping, by the controller, driving of the motor.

Further, the present invention provides a motor control method, wherein, when a controller recognizes a driving signal for a motor, the controller may be configured to determine a failure of multiple Hall sensors indisposed within the motor, based on signals detected by the multiple Hall sensors, and identify a faulty Hall sensor from among the multiple Hall sensors by analyzing respective frequencies of the signals detected by the Hall sensors.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
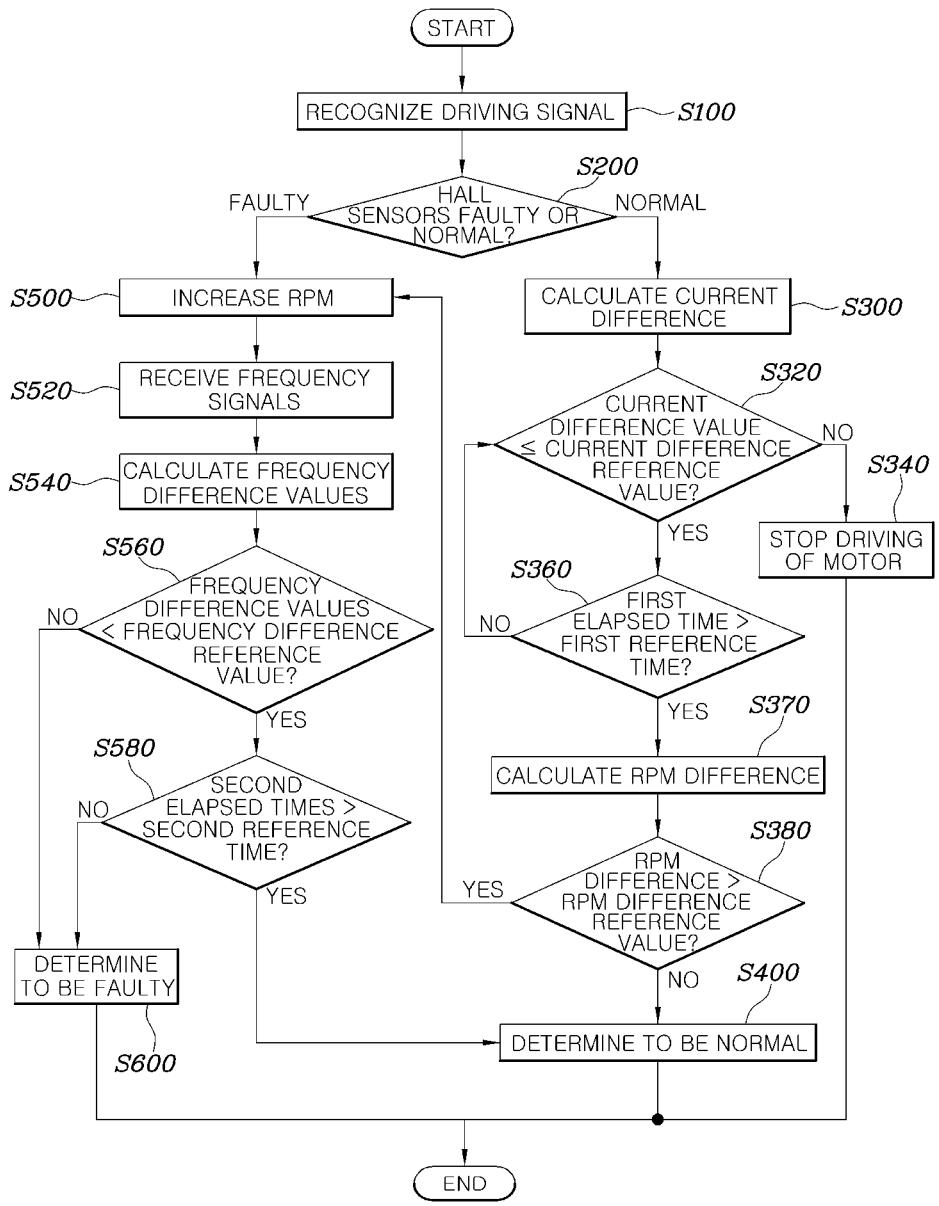
FIG. 1 is a flowchart showing a motor control method for fault diagnosis of Hall sensors according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, exemplary embodiments of the present invention will be described in detail with reference to the attached drawings.

Generally, in a motor, sensors are provided to detect the position and speed of a rotor equipped with a permanent magnet. In motors of a complex driving system, a resolver sensor having high precision may be used, but in motors used in typical pumps, compressors, or blowers, cheaper Hall sensors may be used. However, Hall sensor signals are disadvantageous in that it may be difficult to determine whether sensors are abnormal using only the output signals of the sensors. Therefore, referring to FIG. 1, the present invention presents a motor control method capable of detecting failures in Hall sensors in the motor.

Figure 2:
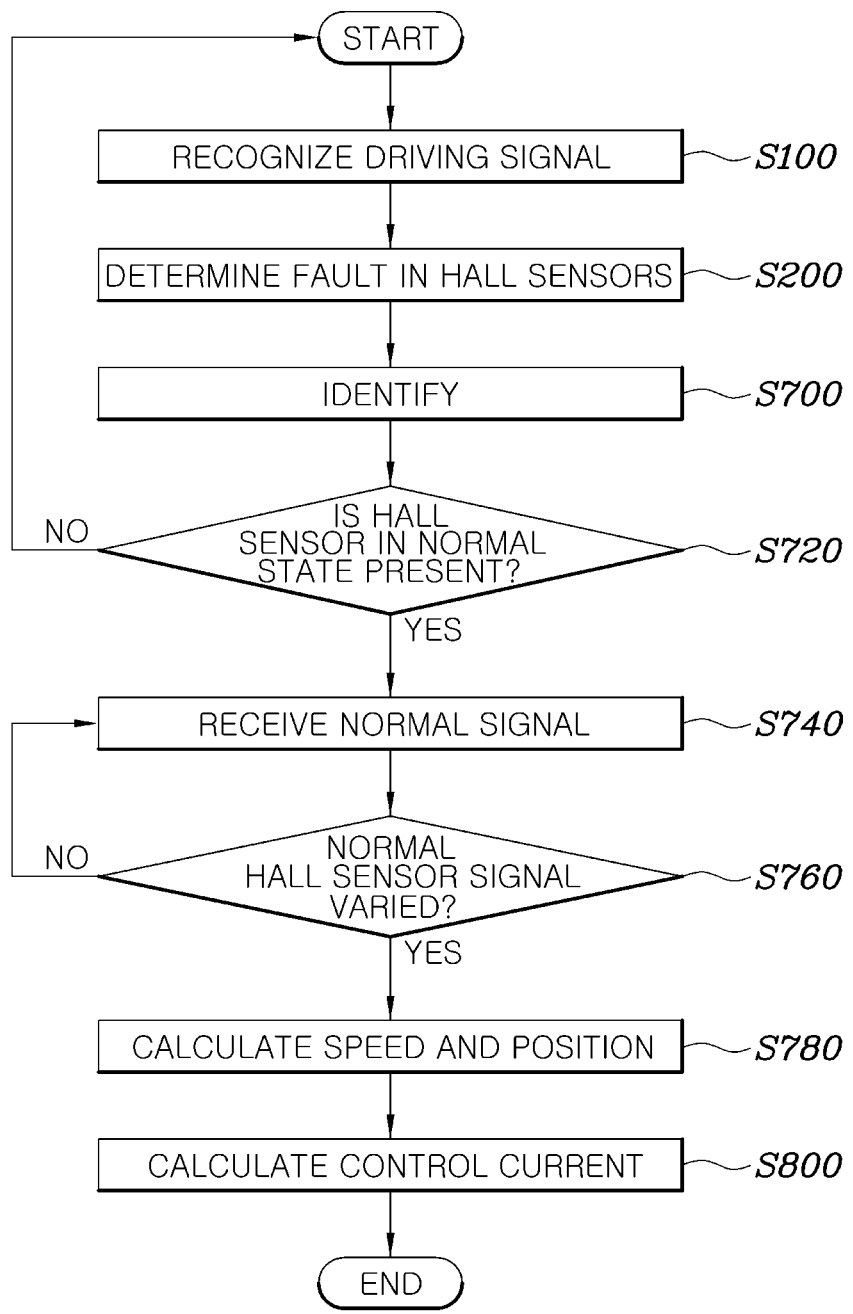
FIG. 2 is a flowchart showing a motor control method performed when some Hall sensors are faulty according to an exemplary embodiment of the present invention.

As shown in FIG. 1 and FIG. 2, the motor control method according to the present invention may include recognizing, by a controller, a driving signal for a motor (S100); when the driving signal is recognized, determining, by the controller, a failure of multiple Hall sensors indisposed within the motor, using signals detected by the Hall sensors (S200); and when the failure of the Hall sensors is detected, analyzing, by the controller, respective frequencies of the signals detected by the multiple Hall sensors, thus identifying a faulty Hall sensor from among the multiple Hall sensors (S300).

In accordance with the present invention, when the driving signal for the motor is recognized in the state in which the motor has stopped, the controller may be configured to detect whether a failure of the multiple Hall sensors has occurred. The determination is intended to determine whether the Hall sensors in the motor are normal or abnormal (e.g., whether a failure has occurred). When all of the Hall sensors in the motor are abnormal, a separate fault diagnosis in the respective Hall sensors in the motor may be omitted. Thus, before the identification step S700, this step S200 may be performed, and a separate motor control may be performed when all of the Hall sensors in the motor are normal (e.g., operating without failure).

Furthermore, a failure of the Hall sensors may also be determined using the rotational speed (revolutions per minute: RPM) of the motor or variation in current generated by the driving of the motor. For example, the present invention presents a method by which, when multiple Hall sensors disposed within the motor transmit the same detected signal, a controller may be configured to determine a failure in the Hall sensors. The Hall sensors may be configured to transmit various signals based on the types thereof, but generally may be configured to transmit digital signals. In other words, the Hall sensors may be configured to transmit signals in the form of 0 or 1 or the form of OFF or ON. Therefore, the present invention presents a method of determining whether Hall sensors are faulty using this characteristic.

Figure 3A:
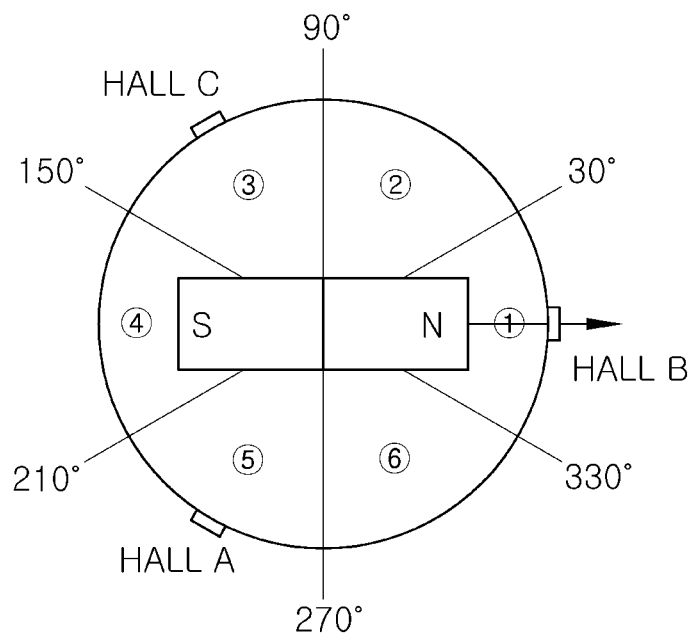
FIGS. 3A-3B are tables illustrating a comparison between Hall sensor signals when Hall sensors are normal and when the Hall sensors are faulty (abnormal) according to an exemplary embodiment of the present invention.
Figure 3A:
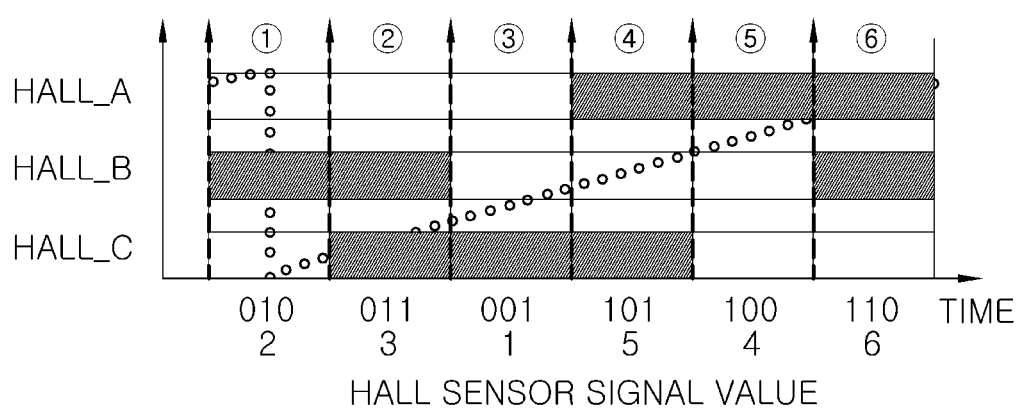
Figure 3B:
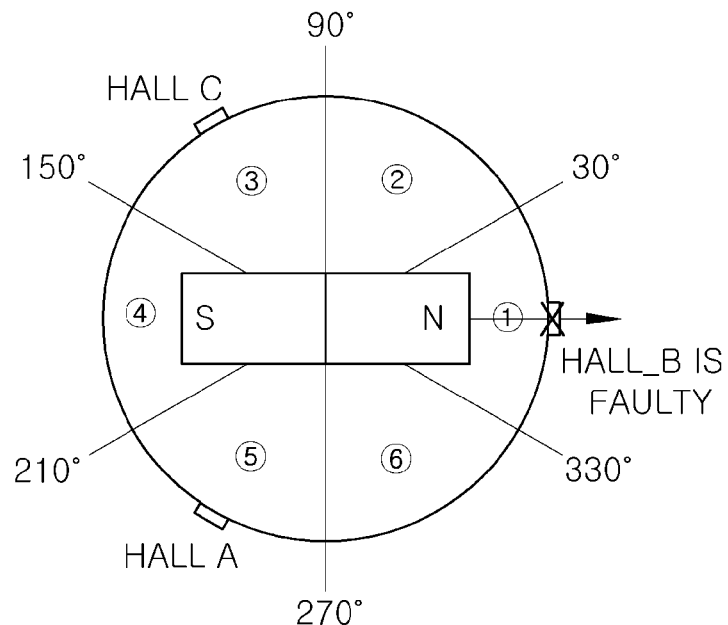
Figure 3B:
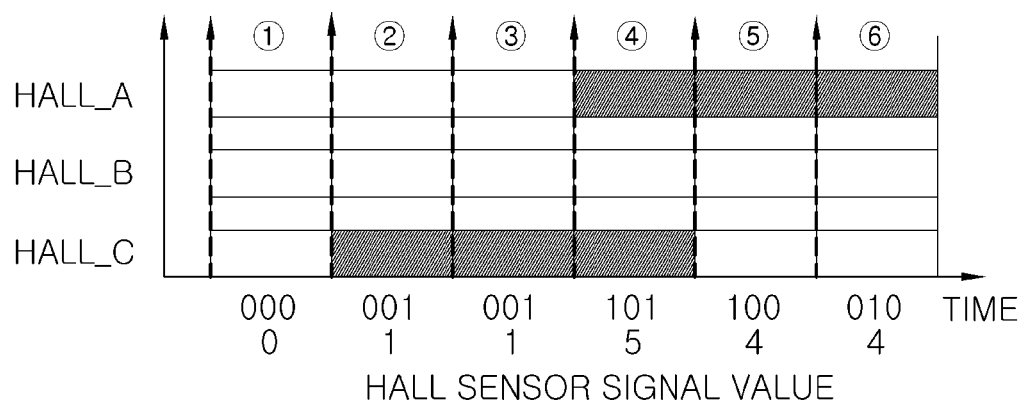

As described above, signals from the Hall sensors may be digital signals represented by 0 or 1. Therefore, when a motor having three Hall sensors that are generally used is given as an example, sensor signal values obtained when all of the Hall sensors are normal are varied at rotation intervals of 60°. In other words, since the signal values from the Hall sensors are configured, as shown in FIG. 3A, Hall sensors A, B, and C may not transmit the same signal, i.e. a signal of 0 or 1, in the sections of ①~⑥ of FIGS. 3A-3B under any circumstances. In FIGS. 3A-3B, although the case where the number of Hall sensors is 3 has been illustrated, all Hall sensors may not transmit the same signal even when there are three or more Hall sensors. Therefore, according to the present invention, when none of Hall sensors disposed within the motor transmit the same signal, the Hall sensors in the motor may be determined to be normal (e.g., operating without error), and then a subsequent step is performed.

As shown in FIG. 1, when the multiple Hall sensors are determined to be normal, the controller may be configured to calculate a current difference value that is a difference between a current command value generated by the driving of the motor and a motor control current value; and compare the calculated current difference value with a preset current difference reference value.

The current command value may be a value generated via rotational speed generated by the driving of the motor. When the motor is driven to obtain the output of the motor targeted by a user, a rotational speed (RPM) command value for the motor may be converted into a current command value via a speed controller. In particular, the RPM command value indicates the RPM value of the motor arbitrarily set by the user to obtain the output of the motor. Therefore, the RPM command value may be present as various values based on the user request and the type and state of motors. As a result, the current command value may also be present as various values. The speed controller may also be implemented in various forms, such as, a Proportional Integral (PI) controller.

Since the motor control current value is a current value flowing through the three phase motor, the current difference value in the present invention may consequently be regarded as a difference between the current command value, which is output by the speed controller as previously stated and the control current value, which is flowing through the three phase motor.

A larger current difference value indicates that the motor is insufficient performing a function (e.g., function is not accurately performed), and thus separate control may be required. The current difference reference value may be a previously set value, stored in a separately provided memory unit or the flash memory unit of the controller. Therefore, the controller may be configured to stop the driving of the motor when the current difference value is greater than the current difference reference value, that is, a difference between an allowable target current and a current actually flowing through the motor.

The current difference reference value, which is a reference value required to stop the motor driving, may be present as various values based on the type of motors and the type of devices in which the motors are used. When the accurate operation of the motor is required, the current difference reference value may be set to a minimal value. When a device in which a wide allowable error range is permitted, the current difference reference value may be set to a greater value.

However, when the calculated current difference value is greater than the current difference reference value, regardless of the method for setting the current difference reference value, current control may be determined to be blocked or impossible due to a failure in a current sensor or a 3-phase switching circuit, thus blocking or preventing the driving of the motor. Accordingly, the controller may be configured to stop the driving of the motor to maintain safety.

When the current difference value is less than or equal to the preset current difference reference value, the controller may be configured to compare a first elapsed time, which is a period of time elapsed from the time at which the driving signal for the motor is recognized, with a preset first reference time, as shown in FIG. 1; and when the first elapsed time is greater than the first reference time, calculate an RPM difference value, which is a difference between the RPM command value generated by the driving of the motor and the RPM value of the motor.

The above-described first reference time comparison step S360 and the RPM difference calculation step S370 may be prepared for secondary diagnosis to prevent a determination error when detecting a failure at the Hall sensor even when all of the Hall sensors are determined to be normal at step S200. The current sensor and the 3-phase switching circuit of the motor have been determined to be in a normal state at the step S320 of comparing the current difference value with the preset current difference reference value. Accordingly, when, during the determination of whether an error is present in the operation of the motor, an error in the motor operation is determined to be present, the error may be determined to be an operation error attributable to the Hall sensors in the motor.

Furthermore, the first reference time may be the maximum time required by the motor to normally perform current control. It may be possible to perform more accurate fault diagnosis when the presence or non-presence of the operation error in the Hall sensors in the motor is determined after the first elapsed time, which is the period of time elapsed from the time at which the driving signal for the motor is recognized, has exceeded the first reference time. Accordingly, the controller may be configured to execute the first reference time comparison step S360, thus providing a margin required by the motor to perform normal current control. Similar to the above-described current difference reference value, the first reference time may be stored in the separately provided memory unit or in the flash memory unit of the controller. At the RPM difference calculation step S370, an RPM difference value, which is a difference between the RPM command value and the RPM value of the motor, may be calculated. As described above, the RPM command value may have various values based on the output desired by the user to be obtained using the motor.

Moreover, the RPM of the motor may be considered to detect a failure of the Hall sensors in the motor since detection of the RPM is a function of the Hall sensors to detect the speed of the rotor. Therefore, when a fault in the Hall sensors is detected in the motor, the speed of the rotor may not be accurately detected, and thus, using the rotating speed of the motor, a failure of the Hall sensors in the motor may be determined. Hence, as shown in FIG. 1, when the calculated RPM difference value is less than or equal to the preset RPM difference reference value, the controller may be configured to determine that the Hall sensors in the motor are in a normal state.

Additionally, the RPM difference reference value indicates an error value falling within a range in which an error is not caused in the operation of the motor, similar to the above-described current difference reference value. Since there is an inevitable difference between the RPM reference value, which is a theoretical value, and the RPM value of the motor, which is an actually measured value, the RPM difference reference value may also be provided to compensate for such a difference. The RPM difference reference value may also be present as various values based on the type of motors and the type of devices in which the motors are used, similar to the current difference reference value. Further, similar to the current difference reference value, the RPM difference reference value may also be stored in the separately provided memory unit or the flash memory unit of the controller.

When the calculated RPM difference value is less than or equal to the RPM difference reference value, the RPM of the motor may be considered to be accurately detected by the Hall sensors, and thus all of the Hall sensors provided in the motor may be regarded as being in a normal state. Therefore, in the present invention, the controller may be configured to determine that the Hall sensors in the motor are in a normal state.

In addition, when the RPM difference value is greater than the preset RPM difference reference value, a condition has changed. Particularly, even when the Hall sensors are determined to be normal, the failure in the Hall sensors may be determined again due to the condition change. Since the Hall sensors may easily break down due to the torque and force attributable to the fast rotation of the motor, the Hall sensors may sufficiently fail in a subsequent operating procedure even when determined to be normal, and thus a failure in the Hall sensors may be detected at the corresponding step. Therefore, when the calculated RPM difference value is greater than the preset RPM difference reference value, the controller may be configured to identify a faulty Hall sensor from among the Hall sensors. This step is identical to the identification step S700 which is performed when Hall sensors are determined to be faulty at the Hall sensor fault determination step S200.

Furthermore, the method by which the controller determines a failure the Hall sensors may be implemented using various methods, as described above. In accordance with the present invention, when all Hall sensors disposed within the motor transmit the same signal, a failure of the Hall sensors may be detected. This corresponds to the reverse case of the above-described normality determination, and corresponds to FIG. 3B. As shown in FIG. 3B, when one of the Hall sensors (e.g. Hall sensor B in FIG. 3B) fails, the Hall sensor B is incapable of transmitting a signal and will transmit a signal of 0 regardless of the position where the permanent magnet is located. Further, FIG. 3B shows that all of Hall sensors A, B, and C transmit signals of 0 in section ① in the graph of FIG. 3B. Therefore, in the present invention, a failure of the Hall sensors may be determined using the graph of FIG. 3B.

In accordance with the above-described method, the controller may be configured to detect that, among the three Hall sensors, Hall sensor B has failed. However, when two or more of the Hall sensors have failed, the Hall sensors may not be distinguished to thus determine which Hall sensor has failed. In particular, when four or more Hall sensors are disposed within the motor, it may be difficult to determine which of the Hall sensors has failed, using only the above-described method. Therefore, when a failure in the Hall sensors is detected, the controller may be configured to identify a faulty Hall sensor from among the Hall sensors (S700).

In particular, as shown in FIG. 1, the identification process S700 may include increasing, by the controller, the RPM of the stator of the motor to a preset target RPM value; after the RPM of the motor stator has reached the target RPM value, receiving, by the controller, frequency value signals detected by the respective Hall sensors indisposed within the motor; and calculating, by the controller, frequency difference values that are differences between the received frequency values of the respective Hall sensors and a frequency reference value.

Particularly, the increase in the RPM of the stator of the motor has the same meaning as the increase in the rotational speed of a rotating magnetic field formed in the stator of the motor. Therefore, the controller may be configured to increase the rotational speed of the rotating magnetic field formed in the stator of the motor to synchronize the rotating magnetic field formed by the rotation of the stator with a rotating magnetic field formed by the rotation of the rotor. To derive a precise Hall sensor frequency value, the stator and the rotor of the motor may be rotated by the rotating magnetic fields thereof synchronized with each other to thus increase the RPM of the stator.

The target RPM value may be an angular velocity, which has the unit of [rad/s], and may be present as various values. However, when the target RPM value is set to an excessively large value, there is concern that the rotor will not be rotated in synchronization with the stator and will be out of phase, and thus the target RPM value may be set to a suitable value within the range of prevention of such a situation. The target RPM value may also be stored in the separately provided memory unit or the flash memory unit of the controller.

When the RPM of the motor stator (or the rotational speed of the rotating magnetic field formed in the motor stator) has reached the target RPM value, the frequency signal reception step S520 may be performed. In particular, the frequency values detected by the Hall sensors indicate the frequencies of pulse signals formed due to the repetition of signals of 0 or 1 that are transferred to the controller by the Hall sensors. Since the Hall sensors according to the present invention may be configured to transmit digital signals, it may be difficult to consider that the signals themselves have certain frequencies. However, when the stator and the rotor of the motor are continuously rotated at a substantially constant speed in synchronization with each other, the Hall sensors may be configured to periodically transmit the same signals of 0 or 1. Consequently, these signals have the form of pulse signals having a regular period, and thus frequency values may be derived. The present frequency signal reception step is intended to individually determine whether all of the Hall sensors provided in the motor are faulty, and thus the frequency values of the respective Hall sensors may be derived.

After the frequency signal reception step S520, the controller may be configured to calculate the frequency difference values, which are differences between the frequency values of the respective Hall sensors and the frequency reference value. The frequency reference value denotes a Hall sensor frequency value when the rotor is rotated at the target rotational speed (RPM) value of the rotating magnetic field formed in the stator. The frequency reference value, which is a value derived based on the period of signals of 0 or 1 detected by the Hall sensors when the Hall sensors are normal, may be obtained using the RPM of the motor or the number of poles of the motor. Generally, as the number of poles of the motor increases, or as the RPM of the motor increases, the period decreases, and thus the frequency reference value may be increased.

After the frequency difference calculation step S540, as shown in FIG. 1, the controller may be configured to compare the frequency difference values with the frequency difference reference value. The frequency difference reference value may be the value required to compensate for differences between theoretical values and actually measured values, similar to the above-described current reference value, and may be present as various values based on the types and RPM values of motors. However, for the purpose of precise fault diagnosis of Hall sensors, which corresponds to the object of the present invention, the frequency difference reference value may be set to a smaller value. Further, the frequency difference reference value may also be stored in the separately provided memory unit or the flash memory unit of the controller.

Regardless of the method of setting the frequency difference reference value, when the calculated frequency difference values for respective Hall sensors are equal to or greater than the frequency difference reference value, the controller may be configured to determine the corresponding Hall sensor to be in a faulty (abnormal) state. In particular, since the corresponding Hall sensor does not transfer a signal of 0 or 1 in conformity with the RPM of the motor, the corresponding Hall sensor may be determined to be in a faulty state.

However, when the calculated frequency difference values for respective Hall sensors are less than the preset frequency difference reference value, the controller may be configured to compare second elapsed times, which are periods of time elapsed from the times at which the calculated frequency difference values for respective Hall sensors are less than the frequency difference reference value, with a preset second reference time. The fact that the frequency difference values are less than the frequency difference reference value may indicate that the Hall sensors are operating more accurately, and thus the Hall sensors may be determined to be in a normal state. However, during the rotation of the motor, faults may occur in the Hall sensors, and thereby the second reference time comparison step S580 may be performed to improve precision in the fault diagnosis of the Hall sensors.

Since the second elapsed times denote periods of time elapsed from the times at which the calculated frequency difference values for respective Hall sensors are less than the frequency difference reference value, failures in the Hall sensors that may occur after the RPM of the motor has reached the target RPM value may be detected at step S580. In addition, at this step, erroneous detection of failures in the Hall sensors may be prevented from being caused by noise signals. Even when the Hall sensors are in a faulty state, the frequency difference values may be instantaneously less than the frequency difference reference value due to noise signals. Therefore, at this step, the second reference time may be provided and configured to filter noise that may occur, thus preventing erroneous detection of faults in the Hall sensors.

Therefore, as the second reference time increases, precision in fault diagnosis of Hall sensors may be further improved. However, when the second reference time is excessively increased, the fault diagnosis may be insignificant, and thus the second reference time may be set to a suitable time within a range in which the usage purpose of the motor is satisfied. Further, the second reference time may also be stored in the separately provided memory unit or the flash memory unit of the controller, similar to the first reference time.

At the second reference time comparison step S580, when a certain second elapsed time is greater than the second reference time, the corresponding Hall sensor may be considered to be in a normal state. Thus, the normality determination step S400 may be performed, as shown in FIG. 1. However, when a certain second elapsed time is less than or equal to the second reference time indicates that, after the RPM of the motor has reached the target RPM value, a failure may be detected in the corresponding Hall sensor, and thus the fault determination step S600 of determining the corresponding Hall sensor to be in a faulty state may be performed.

As described above, by means of the above-described motor control method, when failures in the Hall sensors in the motor are detected, it may be possible to more accurately determine which one of the Hall sensors is faulty. Therefore, the present invention is intended to present a method capable of controlling the motor using this determination even when some Hall sensors are faulty.

As shown in FIG. 2, when the Hall sensors are determined to be faulty at the Hall sensor fault determination step S200, the present invention may more accurately determine which one of the Hall sensors is faulty at the identification step S700. Therefore, after the identification step S700, when any Hall sensor in a normal state is found to be in the motor at step S720 of determining whether any Hall sensor in a normal state is present in the motor, the Hall sensor in the normal state may be used. Therefore, the present invention performs the normal signal reception step S740 of the controller receiving a signal from the Hall sensor determined to be in a normal state; the speed and position calculation step S780 of, when the received Hall sensor signal is varied, the controller calculating the RPM of the motor and the position of the rotor using variation; and the control current calculation step S800 of calculating a motor control current value using the RPM of the motor and the position of the rotor.

In particular, at the normal signal reception step S740, the controller may be configured to selectively receive the signal detected by the Hall sensor determined to be in a normal state at the identification step S700. Since the signals of the Hall sensors determined to be in a faulty state at the identification step S700 are insignificant (e.g., meaningless) signals, the controller may be configured to receive only the signal of the Hall sensor determined to be in a normal state. When there are multiple Hall sensors in a normal state, the controller may be configured to receive all of signals of the multiple Hall sensors without separating the signals to improve precision in motor control.

After receiving the normal signal, the controller may be configured to wait for the signal of the Hall sensor to be varied. In particular, when there is no variation in the signal of the Hall sensor, no variation values are present, and thus variables required to derive the position of the rotor and the RPM of the motor are not present. Therefore, to compensate for faulty Hall sensors using the Hall sensor in a normal state, variation must be present in the signal value of the Hall sensor in a normal state after the controller has received the signal of the Hall sensor in a normal state. Therefore, the controller may be configured to wait for the signal of the Hall sensor in the normal state to be varied at the normal Hall sensor signal variation detection step S760.

At the normal Hall sensor signal variation detection step S760, when variation in the signal is detected, the speed and position calculation step S780 of calculating the RPM of the motor and the position of the rotor using the detected variation may be performed, as shown in FIG. 2. The method for obtaining the position of the rotor at this step will be described in greater detail below.

At the middle position of the rotor having no signal variation due to the failure in the Hall sensors, the current position of the rotor may be calculated by adding a previous position value to a position variation value obtained by multiplying a current RPM by a time difference between previous and current times. Further, the RPM of the motor may be obtained by differentiating the position value of the rotor when the position value of the rotor is detected. Therefore, when the present method is used, the position of the rotor and the RPM of the motor may be more accurately detected using the normal Hall sensor even when some Hall sensors have failed (are faulty).

When the position of the rotor and the RPM of the motor are more accurately detected by the controller at the speed and position calculation step S780, a motor control current required to drive the motor may be calculated using the position and the RPM. Generally, since the motor control current may be calculated using the RPM of the motor, as described above, the motor control current may be more easily calculated when the RPM of the motor calculated at the speed and position calculation step S780 is used. When the motor control current is calculated, there is no need to further identify faulty Hall sensors at the identification step S700, and thus speed feedback control, which is a typical motor control scheme, may be performed.

The term "speed feedback control" refers to a control method performed when Hall sensors are determined to be normal at the above-described Hall sensor fault determination step S200. Even when all Hall sensors have failed, the motor may be operated in the same manner as that of the normal state using a normal Hall sensor. Therefore, a typical speed feedback control may be used. As described above, when the current difference value is less than or equal to the current difference reference value denotes a situation in which current control is suitably performed, and thus the motor may be driven using the motor control current calculated at the control current calculation step S800.

However, a problem arises when the current difference value, which is a difference between the motor control current value, calculated at the control current calculation step S800, and a current reference value, is greater than a current difference reference value. In particular, in the same manner as that of the above-described scheme, a failure of a current sensor or a 3-phase switching circuit may be determined, and then the controller may be configured to stop the driving of the motor. The current reference value and the current difference reference value are identical to the above-described values, respectively.

Consequently, the present invention relates to a control method, by which the controller may be configured to receive signals detected by multiple Hall sensors disposed within the motor when recognizing a driving signal for the motor, and by which, when all of detected signals are identical to each other, the controller may be configured to respectively analyze the frequencies of the signals detected by the multiple Hall sensors and then identify faulty Hall sensors from among the multiple Hall sensors, thus suitably operating the motor, regardless of the failures in some Hall sensors, based on the identification of faulty Hall sensors even when some Hall sensors are faulty.

When the present invention is used, as described above, the following advantages may be obtained.

First, even when a motor has stopped, failures in Hall sensors disposed within the motor may be diagnosed.

Second, since it may be determined whether individual Hall sensors are faulty, precision in fault diagnosis of the motor may be improved.

Third, a method of suitably controlling the motor when some of Hall sensors in the motor are faulty is presented, and thus the motor may be driven more stably even when some Hall sensors are faulty.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A motor control method, comprising:
    recognizing, by a controller, a driving signal for a motor;
    in response to recognizing the driving signal, determining, by the controller, a failure of multiple Hall sensors disposed within the motor, based on signals detected by the multiple Hall sensors; and
    when the failure of the Hall sensors in the motor is determined, identifying, by the controller, a faulty Hall sensor from among the multiple Hall sensors by analyzing respective frequencies of the signals detected by the multiple Hall sensors and comparing the respective frequencies with a preset frequency reference value.

2. The motor control method of claim 1, wherein the determination of a failure of the multiple Hall sensors comprises:
    in response to recognizing the driving signal, receiving, by the controller, the detected signals from the multiple Hall sensors disposed within the motor; and
    when the multiple detected signals are identical to each other, determining, by the controller, one or more of the multiple Hall sensors to be faulty.

3. The motor control method of claim 1, further comprising, after determining the failure of the multiple Hall sensors:
    when the multiple Hall sensors are determined to be normal, calculating, by the controller, a current difference value that is a difference between a current command value, generated by driving of the motor, and a motor control current value; and
    when the calculated current difference value is greater than a preset current difference reference value, stopping, by the controller, driving of the motor.

4. The motor control method of claim 3, further comprising, after calculating the current difference value:
    when the current difference value is less than or equal to the preset current difference reference value, comparing, by the controller, a first elapsed time with a preset first reference time, wherein the first elapsed time is a period of time elapsed from a time at which the driving signal for the motor is recognized;

when the first elapsed time is greater than the first reference time, calculating, by the controller, a rotational speed (RPM) difference value that is a difference between an RPM command value, generated by driving of the motor, and an RPM value of the motor; and when the calculated RPM difference value is greater than a preset RPM difference reference value, identifying, by the controller, a faulty Hall sensor.

5. The motor control method of claim 4, further comprising, after calculating the RPM difference value:

when the calculated RPM difference value is less than or equal to the preset RPM difference reference value, determining, by the controller, the Hall sensors disposed within the motor to be in a normal state.

6. The motor control method of claim 4, wherein the identification of the faulty Hall sensor comprises:

increasing, by the controller, RPM of a stator of the motor to a preset target RPM value;

after the RPM of the stator of the motor has reached the target RPM value, receiving, by the controller, frequency value signals detected by respective Hall sensors;

calculating, by the controller, frequency difference values that are differences between the received frequency values of respective Hall sensors and a frequency reference value; and when the calculated frequency difference values for respective Hall sensors are equal to or greater than a preset frequency difference reference value, determining, by the controller, the corresponding Hall sensors to be in a faulty state.

7. The motor control method of claim 6, further comprising, after calculating the frequency difference values:

when the calculated frequency difference values for respective Hall sensors are less than the preset frequency difference reference value, comparing second elapsed times with a preset second reference time, wherein the second elapsed times are periods of time elapsed from times at which the calculated frequency difference values for respective Hall sensors are less than the frequency difference reference value; and when the second elapsed times are less than or equal to the second reference time, determining, by the controller, the corresponding Hall sensors to be in a faulty state.

8. The motor control method of claim 7, further comprising, after comparing with the second reference time:

when the second elapsed times are greater than the second reference time, determining, by the controller, the corresponding Hall sensors to be in a normal state.

9. The motor control method of claim 1, further comprising, after identifying the faulty Hall sensor:

when a Hall sensor in a normal state is present in the motor, receiving, by the controller, a signal from the Hall sensor determined to be in a normal state;

when the signal from the Hall sensor, received by the controller, is varied, calculating, by the controller, revolutions per minute (RPM) of the motor and a position of a rotor using variation; and calculating, by the controller, a motor control current value using the RPM of the motor and the position of the rotor.

10. The motor control method of claim 9, further comprising, after calculating the motor control current value:

calculating, by the controller, a current difference value that is a difference between a preset current reference value and the motor control current value; and when the calculated current difference value is greater than a preset current difference reference value, stopping, by the controller, driving of the motor.

11. A motor control method, wherein:

when a controller recognizes a driving signal for a motor, the controller is configured to determine a failure of multiple Hall sensors disposed within the motor, based on signals detected by the multiple Hall sensors, and identify a faulty Hall sensor from among the multiple Hall sensors by analyzing respective frequencies of the signals detected by the Hall sensors and comparing the respective frequencies with a preset frequency reference value.

12. A motor control system, comprising:

a plurality of Hall sensors disposed within a motor; and a controller configured to receive a driving signal for a motor, wherein in response to recognizing the driving signal, the controller is configured to determine a failure of multiple Hall sensors based on signals detected by the multiple Hall sensors, and wherein when the failure of the Hall sensors in the motor is determined the controller is configured to identify a faulty Hall sensor from among the multiple Hall sensors by analyzing respective frequencies of the signals detected by the multiple Hall sensors and comparing the respective frequencies with a preset frequency reference value.

13. The motor control system of claim 12, wherein the controller is further configured to:

calculate a current difference value that is a difference between a current command value, generated by driving of the motor, and a motor control current value when the multiple Hall sensors are determined to be normal; and stop driving of the motor when the calculated current difference value is greater than a preset current difference reference value.

* * * * *